US006902452B1

(12) United States Patent
Knight

(10) Patent No.: US 6,902,452 B1
(45) Date of Patent: Jun. 7, 2005

(54) MARINE SPLIT BEARINGS WITH RIGHT ANGLE REMOVEABLE GROOVED RETAINER COVERS

(76) Inventor: Richard S. Knight, P.O. Box 944, Ogunquit, ME (US) 03907

( * ) Notice: Subject to any disclaimer, the term of this patent is extended or adjusted under 35 U.S.C. 154(b) by 0 days.

(21) Appl. No.: 10/303,313

(22) Filed: Nov. 23, 2002

(51) Int. Cl.⁷ .............................................. B63H 23/34
(52) U.S. Cl. ....................................... 440/83; 384/428
(58) Field of Search .................... 440/82, 83; 384/428, 384/537, 584, 620, 273, 502

(56) References Cited

U.S. PATENT DOCUMENTS

| | | | | |
|---|---|---|---|---|
| 2,636,790 A | * | 4/1953 | McNally ...................... 384/99 |
| 2,840,425 A | * | 6/1958 | Howell ........................ 384/97 |
| 3,236,570 A | * | 2/1966 | Satterthwaite ............... 384/97 |
| 3,371,644 A | * | 3/1968 | Yost ........................... 440/112 |
| 3,407,779 A | * | 10/1968 | Satterthwaite et al. ........ 440/82 |
| 3,431,032 A | * | 3/1969 | Haentjens ................... 384/273 |
| 3,470,842 A | * | 10/1969 | Clay ........................... 440/112 |
| 3,540,405 A | * | 11/1970 | Clay ........................... 440/112 |
| 3,606,505 A | * | 9/1971 | Satterthwaite et al. ........ 384/98 |
| 3,685,368 A | * | 8/1972 | Thoma ........................ 74/410 |
| 3,718,378 A | * | 2/1973 | Clay ........................... 384/130 |
| 3,919,962 A | * | 11/1975 | Clay ........................... 114/169 |
| 3,942,466 A | * | 3/1976 | Bunyan ........................ 440/83 |
| 4,005,916 A | * | 2/1977 | Dillon ......................... 384/117 |
| 4,360,349 A | * | 11/1982 | Hansson ...................... 440/75 |
| 4,540,294 A | * | 9/1985 | Lamperski et al. .......... 384/273 |
| 5,906,523 A | * | 5/1999 | Thomson ..................... 440/83 |
| 6,017,151 A | * | 1/2000 | Heinemann ................. 384/294 |

OTHER PUBLICATIONS

Duramax Marine- water Lubricated Bearings and Shaft sealing System☐☐www.duramax-Marine.Com.*
Thordon Composite Marine Bearings.*

* cited by examiner

Primary Examiner—Jesus D. Sotelo
(74) Attorney, Agent, or Firm—Stan Jones, Patents

(57) ABSTRACT

A sternpost or strut bearing assemblage is disclosed having a flat mounting plate integrally formed with a pair of separated collars, which collars have their centers longitudinally aligned with each other to receive a vessel's drive shaft. A pair of opposed split bearing retainer covers is affixed to the mounting plate. Each cover is essentially omega shaped, and on the semi cylindrical inner surface thereof, the cover includes a plurality of longitudinally located retaining grooves having seated therein a mating series of ribs located on the outer surface of a hard semi cylindrical bearing shell which shell has a soft inner water lubrication lining. A split bearing is divided lengthwise at a midpoint parting line into two bearing halves, and each bearing half rides in an associated bearing retainer cover that is fastened by bolts in a removable fashion to the mounting plate of the bearing assemblage proper.

20 Claims, 4 Drawing Sheets

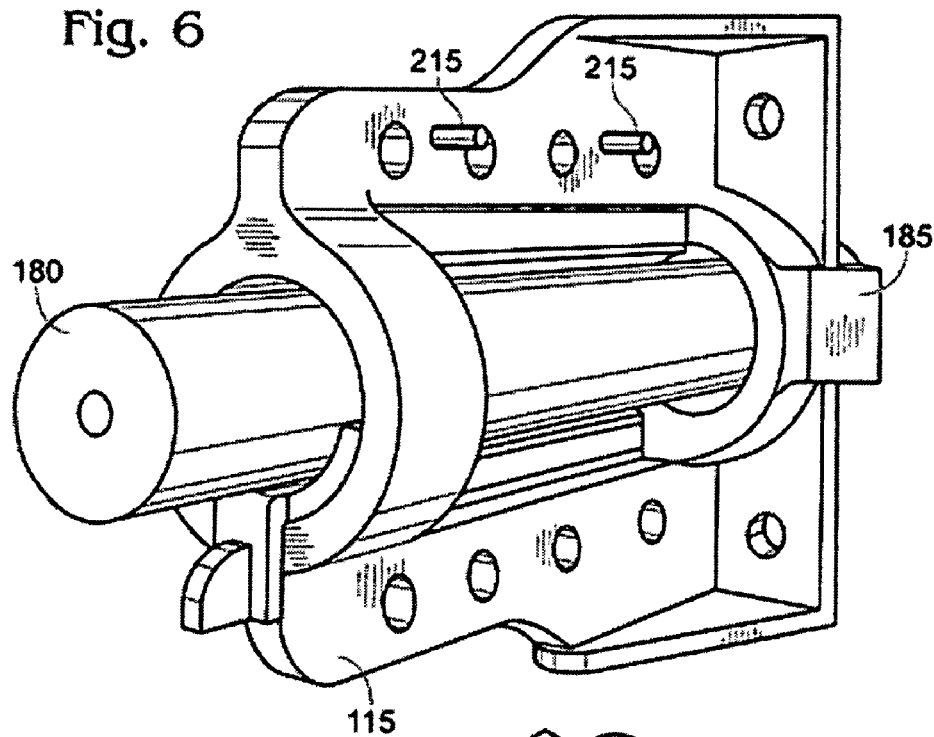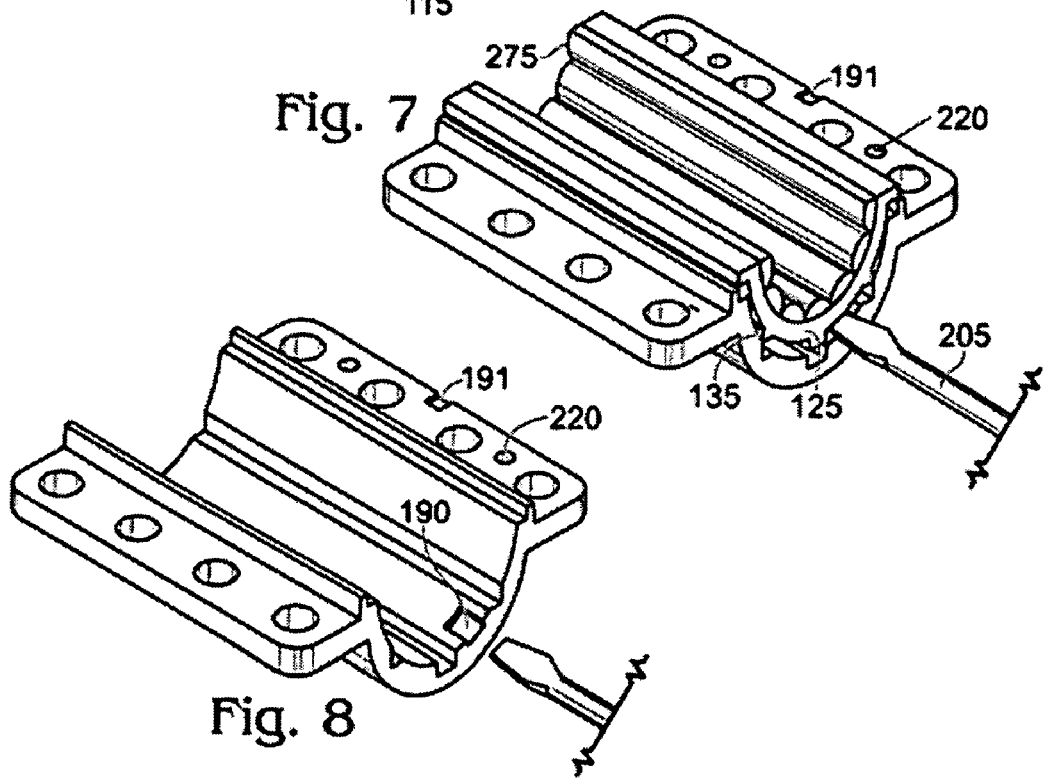

MARINE SPLIT BEARINGS WITH RIGHT ANGLE REMOVEABLE GROOVED RETAINER COVERS

FIELD OF THE INVENTION

The field of the present invention relates to bearings for marine use including a pair of opposed retaining covers holding split bearing halves in place. Further, the field of this marine bearing invention relates to an improved method of bearing replacement either under water or on land without removal of the vessel's propeller, rudder or drive shaft.

EXPLANATION OF TERMS

My invention interfaces and operates in conjunction with marine vessels of varying sizes and keel configurations. Provided below are brief descriptions of certain relevant terms, the understanding of which further underscore the novel features of the invention and provide a basis for a detailed teaching of the improvement in the art provided by this invention.

Underwater Bearings.

Underwater bearings are well known in the marine industry and such are commonly located in bearing housings that are fastened in various manners to keels or sterns of marine vessels. These bearings have a water lubricated insert of soft material, and because of rapid wear—especially in silt and debris laden waters—require replacement before scheduled dry dock or "haul out" dates for the particular vessel. One piece, split piece and stave piece bearings are used and each bearing type poses separate replacement problems most of which are labor intensive, time consuming and very costly.

Drive Shaft, Propeller and Rudder.

Marine vessels have a cylindrical drive shaft running from an inside engine compartment to the outside of the vessel, which shaft turns the propeller in response to engine-driven movement. Conventional bearing designs often mandate the removal of the drive shaft and various propeller components in order to replace a relatively inexpensive—but highly critical—underwater bearing for the vessel. Although some prior art approaches seek to replace bearings without shaft removal, most are unsatisfactory for reasons explained hereinafter.

Bearing Assemblage.

Such an assemblage is mounted at the stern of a marine vessel and in proximity to a stuffing box for a drive shaft that leads from the engine to the vessel's propeller. The assemblage normally includes a mount containing a bearing that houses the drive shaft at a position just forward of the propeller. Underwater bearings of the several known bearing types are fitted within the assemblage. There are two common types of bearing mounts. The first is a bearing mount which has a flat plate on the forward end which is used to secure the mount to the stern post of a wood or fiberglass boat. The second is a strut type typically used on steel vessels where struts are welded to both the mount and the hull.

Split Bearing Retainers.

Commonly used split bearings are normally divided lengthwise at a midpoint parting line and are pressed longitudinally into a pipe housing; or, as in Saterwaite '570 (discussed hereinafter) one bearing retainer contains a split bearing, the other bearing cannot be removed simultaneously with the first but must be rotated around the shaft in order to be removed from the assemblage section which is permanently welded to the hull.

The invention provides a unique bearing assemblage which includes a frame mount having a central opening which has affixed thereto a pair of opposed split bearing retainer covers. Each cover, on a semi cylindrical inner surface thereof, includes a plurality of longitudinally located retaining grooves having seated therein a mating outer surface of a semi cylindrical bearing lining. On the inner surface of the lining, and forming part of a split bearing pair, is a known bearing substance of any suitable configuration, such as rubber or a polymer alloy. Each split bearing section rides in an associated bearing retainer cover that removably mounts to the bearing assemblage proper.

Frame with Fore and AFT Collar Sections.

The invention provides a novel double yoke mounting frame that includes a pair of collar openings for receiving and housing a vessel's drive shaft at the fore and aft locations of the mounting frame irrespective of the assemblage type for differing vessels. The purposes of the collars include providing an area of the frame for welding struts, prevent the bearing halves from moving longitudinally, and to prevent debris wrapped around the propeller and shaft from scouring away the soft bearing material. These collars also provide a mass of frame material from which some slots or grooves can be incorporated to allow for alternate lubricating water flow should the propeller and shaft become fouled.

Integrally joining the two collar sections are side plates that define an opening in the center of the frame for housing a split bearing, which bearing is itself seated within a pair of opposed bearing retainer cover plates. Such plates cover both sides of this opening in the mounting frame, and these cover plates are bolted or otherwise removably fastened to the frame so that the split bearing may be removed and replaced without removal of the vessel's propeller, rudder or drive shaft.

Once the bolts securing the two retainer cover plates are removed, both retainer plates can be removed simultaneously at right angles to the frame and propeller shaft with no other procedures being required. Installation is the reverse process. No known prior art teaches or suggests this simple procedure and novel structure.

BACKGROUND OF THE INVENTION

Marine vessels, whether for salt or fresh water, nevertheless have requirements for bearing replacement. Such replacement—for a relatively inexpensive bearing item—often renders the vessel inoperative for a period of several days while the propeller, rudder, and drive shaft are removed in order to repair or replace a water lubricated bearing. Brown water is characterized by silt, mud, and debris. River tow-boats, tug boats and cutter head dredges in such brown water are prone to costly delays and repair bills. The invention reduces such expenses and provides a simple and efficient bearing replacement method and apparatus which is highly advantageous and may even be used by non trained divers working under water for such repair efforts.

A clearance space between the end of the bearing assemblage and the front part of the propeller hub is often fouled by lines, fishing nets and sundry other debris. Such material winds around the drive shaft and fills this space in a so-called "beehive" fashion. So completely does the debris jam this space that even very high horsepower engines have been stalled by the fouling. Moreover, such debris blocks water flow through the bearing and thus hastens bearing failure. The invention, to a high degree, guards against such failures.

A bearing assemblage in accordance with the invention, for the first time, satisfactorily teaches and claims a housing and assemblage configuration that allows bearing replacement without undue cost and delay in vessel operations.

DESCRIPTION OF PRIOR ART

Turning now to the prior art, a search has revealed various patents, several of which are only of peripheral relevance to the marine vessel bearing replacement industry. These reference patents will be discussed briefly in order to point out the lack of significant relevance to this invention. Such patents are grouped by commonality of inventor ship for ease of discussion.

U.S. Pat. No. 3,236,570 to Satterwaite (Feb. 22, 1966)
U.S. Pat. No. 3,317,254 to Satterwaite (May 2, 1967)
U.S. Pat. No. 3,407,779 to Satterwaite (Oct. 29, 1968)
U.S. Pat. No. 3,605,505 to Satterwaite et al (Sep. 20, 1971)
U.S. Pat. No. 3,470,842 to Clay (Oct. 7, 1969)
U.S. Pat. No. 3,718,378 to Clay (Feb. 27, 1973)
U.S. Pat. No. 3,540,405 to Clay (Nov. 17, 1970)
U.S. Pat. No. 3,919,962 to Clay (Nov. 18, 1975)
U.S. Pat. No. 2,636,790 to McNally (Apr. 28, 1953)
U.S. Pat. No. 3,685,368 to Thoma (Aug. 22, 1972)
U.S. Pat. No. 5,906,523 to Thomson (May 25, 1999)
U.S. Pat. No. 2,840,425 to Howell (Jun. 24, 1958)
U.S. Pat. No. 4,360,349 to Hansson (Nov. 23, 1982)
U.S. Pat. No. 3,431,032 to Haentjens (Mar. 4, 1969)
U.S. Pat. No. 3,371,644 to Yost (Mar. 5, 1968)
U.S. Pat. No. 4,540,294 to Lamperski et al (Sep. 10, 1985)
U.S. Pat. No. 3,942,466 to Bunyan (Mar. 9, 1976)
U.S. Pat. No. 4,005,916 to Dillon (Feb. 1, 1977)
U.S. Pat. No. 6,017,151 to Heinemann (Jan. 25, 2000)

In the discussion that follows, the above-identified patents are simply referred to by the inventor's last name.

Satterwaite Patents.

In Satterwaite U.S. Pat. No. 3,236,570 a housing having a solid bottom casing holds a split bearing for both a solid strut and a stern post mount. The solid casing has a demountable top cover that is bolted in place, and when removed allows a user to mechanically drive the lower bearing in the direction of arrow 43 of his FIG. 5. The bearing per se has a smooth outer semi cylindrical shell 32 having on the inner surface thereof a soft rubber lining 33 incorporating a series of longitudinal grooves 34.

Of particular interest in Satterwaite '570 is the background discussion at Column 1 line 48 through Column 2, line 43 of the three general constructions of marine vessel housing practices. The bearing assemblage of this invention accommodates all such vessel mountings.

Apparently recognizing the inherent difficulties in a peripheral removal of a bearing fouled by corrosion ala Safterwaite '570, the Safterwaite '254 patent utilizes an access cover 51 into which a small electric motor and associated gear tooth drive attempts to remove a bearing by peripheral force. In his FIG. 9, pry bars engage peripheral teeth 30 formed in one central ring 27 after the drive shaft weight has been relieved from the bearings proper.

Satterwaite '779 uses bearing staves as shown in FIGS. 7 and 10, which staves are provided with a series of longitudinally spaced teeth openings 73 allowing a pry device to force the staves rearward once the propeller (and, in many instances, rudder gear) have been removed. Satterwaite '505 is continuation of Safterwaite '779 and adds nothing further of interest.

The Clay Patents

The Clay patents all relate to a type of bearing that requires a seal at point of entry of the drive shaft to the interior of the hull. Clay has provided bearing sections that allow an innermost portion of the bearing to be removed from within the ship for shaft inspection while the vessel is afloat and underway. The Clay structure does not seem to be of interest to the invention.

McNally and Heinemann

U.S. Pat. No. 2,636,790 to McNally involves a thrust bearing that has a pneumatically inflatable cushion 36, FIGS. 3 and 4, which allows an operator to minimize the transmission of longitudinal vibrations for silent running.

U.S. Pat. No. 6,017,151 to Heinemann is a two material bearing wherein one bearing portion has projections beyond the other bearing portion, which other bearing is of a softer material such that impressions are formed in the softer bearing material when the two are mechanically joined.

Neither the structure nor method of these references is of relevance.

Thoma

U.S. Pat. No. 3,685,368 to Thoma minimizes the tilting of the gear-carrying section of a vessel's propeller drive shafting system. The Thoma disclosure includes extra bearing supports, which have elliptically oriented support surfaces, installed next to the gear tooth main support bearings in his drive system. Neither the structure nor method is believed to be relevant.

Thomson and Dillon

U.S. Pat. No. 5,906,523 to Thomson discloses a series of independent jack means equidistantly spaced from a vertical axis of the bearing housing and a pedestal for hydraulically positioning the drive shaft at a desired level.

U.S. Pat. No. 4,005,916 to Dillon includes a gas under pressure through a manifold supplied with lubricant contained in a closed system and delivered via passageways 31 to bearing pockets 30 of FIG. 5. The purpose of Dillon is to replace water lubricated bearing of Applicant's invention.

These two references do not seem relevant.

Howell

U.S. Pat. No. 2,840,425 to Howell discloses a split sleeve bearing housing for a flax rope type packing 24. End caps 30 are threaded on the housing ends to seal the packing in place. For replacement, the caps are removed and the drive shaft is allowed to drop low enough to wind the flax packing around the shaft. No method for reassembly is discussed and the patent seems totally impractical in a workaday world.

Hansson

U.S. Pat. No. 4,360,349 to Hansson is marine transmission that is of no relevance.

Haentjens

U.S. Pat. No. 3,431,032 to Haentjens is not practical in marine use and is a cast split bearing housing that is of no relevance.

Yost

U.S. Pat. No. 3,371,644 to Yost discloses a coupling in FIG. 7 that is used to join two shaft sections together, which sections are grooved for alignment purposes. Yost does not seem relevant to the invention.

Lamperski

U.S. Pat. No. 4,540,294 to Lamperski et al relates to several different clip links of varying shapes for holding two parting faces of a split bearing shell together with limited relative displacement. It is not relevant to the invention.

Bunyan

U.S. Pat. No. 3,942,466 to Bunyan relates to rigid mounting of a flanged tailshaft having a self aligning thrust bearing secured to the interior of a stern tube. It is not relevant to the invention.

In summary, such art discloses split and stave bearings for underwater lubricating use being held in bearing assemblages of varying shapes and designs. Ease of replacement—particularly without removing shaft, rudder or propeller has long been desirable. The problem, however, prior to the advent of this invention, had not yet been satisfactorily solved. Applicants double yoke mounting frame together with omega shaped split bearing cover retainer plates solves this long standing problem in a new and novel manner not taught nor suggested by the prior art.

The advantages and inventive nature of my apparatus and method over the aforementioned prior art is significantly two fold. First, a user can more efficiently replace a worn bearing in an efficient manner without losing days of "lay up" time that characterizes the prior art. Second, inexperienced divers may quickly and simply replace worn bearings without requiring a "haul out" for the repair job.

My apparatus and method physically locates a split bearing held in place by opposed retainer covers in a mounting plate opening which is centered between fore and aft frame collars. These covers both hold and remove the split bearing. Bearing replacement with the invention may simply and efficiently be accomplished without undue loss of operating time for the vessel being repaired.

SUMMARY OF THE INVENTION

This underwater marine bearing includes a unique bearing assemblage having an essentially rectangular flat mounting plate with an elongated rectangular opening in the center thereof. Located at the ends of the plate is a pair of separated collars ("dual yoke") which collars are longitudinally aligned with each other and are welded or otherwise integrally formed in said mounting plate. This flat mounting plate also has flat integral upper and lower frames interconnecting these collars in order to define the generally centrally positioned bearing-receiving opening through the mounting plate.

Bolted to the mounting plate is a pair of opposed split bearing retainer covers having a semi cylindrical shape which is adapted to receive and house a split bearing for the particular drive shaft in question. Formed into the semi cylindrical inner surface of each cover is a plurality of longitudinally located retaining grooves. These grooves in turn have seated therein a mating grooved outer surface of a semi cylindrical bearing.

The covers are bolted or otherwise fastened in place over the bearing housing opening in the mounting frame, and these covers together hold mating semi cylindrical bearing shells in place over the drive shaft. The inner surface of the split bearing pair may be selected from any known bearing substance, such as rubber or a polymer alloy. This interior bearing surface material is adapted to water lubricate a drive shaft carried by the assemblage.

Rather than having smooth exterior shell surfaces of the prior art, the bearings shells of this invention are fitted with protuberances in the nature of lengthwise grooves and lands. Such protuberances, or ribs, mate with—and fit into—corresponding grooves and lands on the interior of the retainer covers. These mating ribs both secure the bearings in a non rotating manner and also provide for ease of replacement with new split bearings as required.

For replacement, my method requires that the weight of the drive shaft be temporarily removed from the lower bearing section. Such removal may be done by lifting the drive shaft by pull chains, jacks or the like. An arcuate-shaped shim, or chock, is manually slipped into one of the frame collars where it is placed under the drive shaft. This chock will hold the shaft a small distance away from the bearing as necessary for removing the shaft weight from the bearing. Indeed the thickness of the chock itself is dimensioned so as to center the drive shaft in the frame collars as an aid in assuring an easy, non-binding bearing removal and replacement operation.

Index pins on the mounting plate, together with registration holes in the bearing covers, serve to accurately and simply position and locate the covers and the bearings they contain for easy right angle removal and replacement during repair operations. Split bearings, as known in the prior art, have a centrally divided parting line defining two bearing halves. In accordance with the invention, an inner periphery of the bearing material itself extends a compensation amount beyond a perpendicular plane starting at the edge of the outer periphery of the bearing material.

When the retaining covers are tightened in place by the installation bolts, the compression of the inner surfaces of the bearing material causes a swelling, which swelling of this compensation material in turn compensates for the compression of the bearing material by the weight of the shaft and the propeller. The result is a relatively round bore with a decrease in resonant vibrations.

Each bearing cover has an indentation therein that allows a screwdriver or pry device to quickly and easily remove a worn split bearing that is corroded in place without requiring an inward crushing of the bearing shell as characterized by the prior art. The down stream collar of the frame collar pair is relieved with some water passages. These passages serve as a water outlet for the lubricant should the aft shaft near the propeller become fouled. These and other features of the invention are further described in more detail hereinafter.

OBJECTS OF THE INVENTION

It is an object to provide a simplified bearing assemblage which facilitates bearings to be replaced on land or underwater without necessitating removal of the vessel's rudder, propeller or drive shaft.

It is an additional object to simplify bearing retaining means for easy removal and replacement by unskilled workers.

It is yet another object to provide grooved exterior shells for split bearings together with mating grooves in bearing retainer covers for simplified bearing location and ease of replacement.

It is another object to provide a bearing assemblage of a novel shape including a double collar yoke having pipe ends fore and aft and upper and lower frames for holding underwater bearings for a drive shaft of a vessel.

It is a further object to locate pilot pins and pilot holes for positioning and holding bearing retainer covers in place on a bearing housing to simplify and improve bearing replacement operations.

It is an object to provide a method and apparatus with additional dimensions of bearing replacement in removable bearing retainer covers.

It is a further object to assure ease of removal of corroded worn bearings by a bearing replacement feature in the bearing covers of the invention.

BRIEF DESCRIPTION OF THE DRAWING

FIG. 6 is a sternpost mount with the port side cover and the chock of FIG. 5 removed;

FIG. 7 is a view showing the bearing shell parted slightly from a retaining cover; and FIG. 8 depicts a pry indentation for receiving a pry tool for removing a split shell from a cover in accordance with this invention.

DESCRIPTION OF EMBODIMENT(S)

Figure 1:
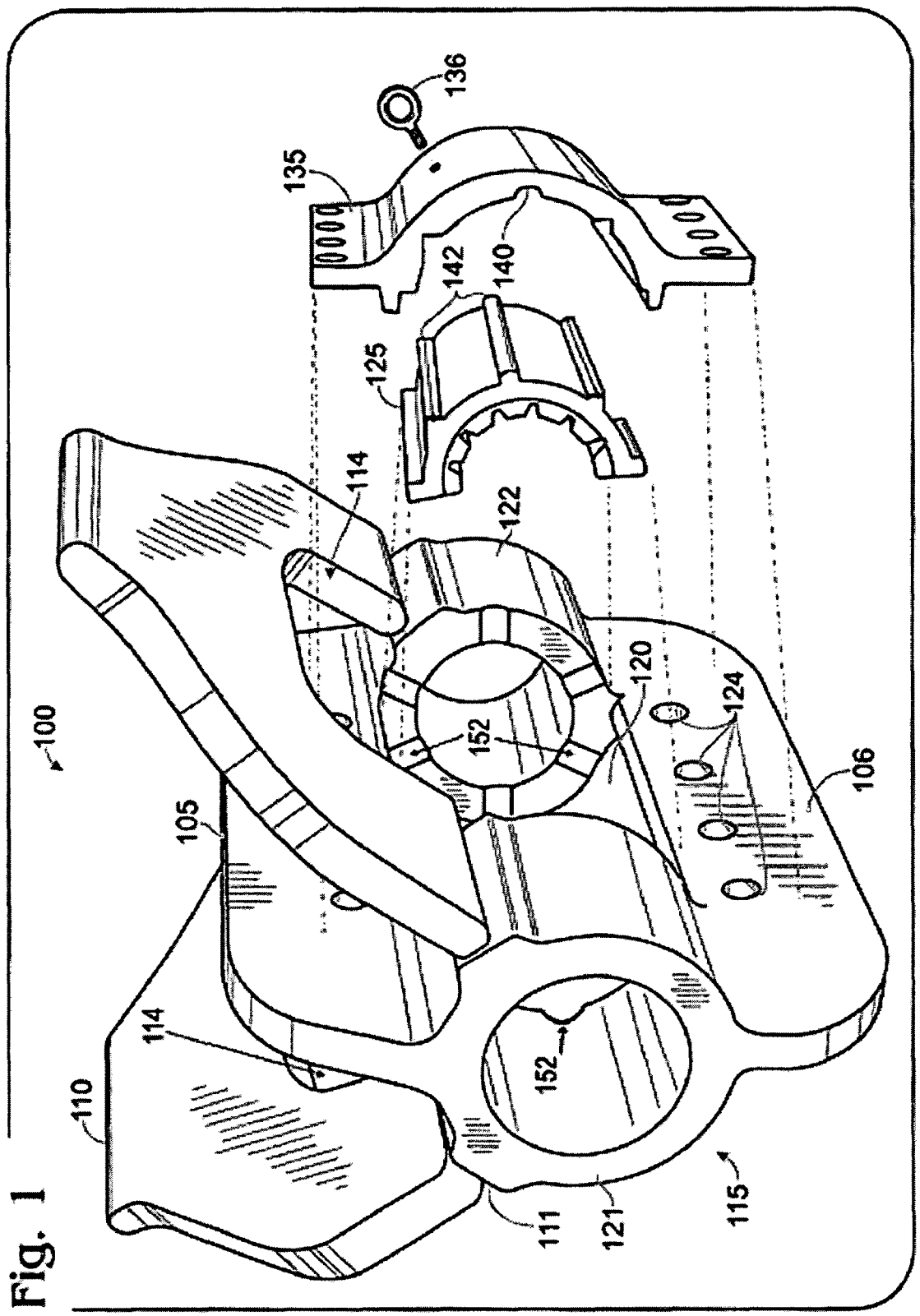
FIG. 1, is a perspective view of a strut mount embodiment of my invention.

This underwater marine bearing assemblage 100 of FIG. 1 is adapted for a strut mount on a vessel (not shown). A pair of struts 110 is welded to raised longitudinal lands 111 on the upper radial sectors of each collar 121 and 122. Such struts are well known in the art. In each of these struts 110, however, a unique bearing removal arch 114 is provided in order to allow clearance space for ease of removal and replacement of underwater bearings as necessary.

The bearing assemblage 100 includes an essentially rectangular flat mounting plate 115 which plate is provided with an elongated rectangular opening 120 in the center thereof. Located at the ends of the plate is a pair of separated frame collars 121 and 122 ("dual yoke") which collars have their centers longitudinally aligned with each other and are welded or otherwise integrally formed into said mounting plate 115. This flat mounting plate 115 also has flat integral upper and lower frames 105 and 106 interconnecting these collars 121, 122 in order to define the centrally positioned bearing-receiving opening 120 in the middle of mounting plate 115. (Although opening 120 is shown in a rectangular configuration, a square mounting plate and square opening in some vessel configurations may of course be satisfactory without departing from the principles of my invention.)

A row of bolt openings 124 are shown in the lower frame 106. Similar bolt receiving holes are also present in the upper frame 105, and bolted or otherwise fastened thereat, are a pair of opposed covers, such as cover 135, which cover is shown exploded away from the assemblage 100. Each cover for the mounting plate is a retainer for receiving one split bearing 125 from a pair of opposed split bearings. These bearings and their retaining covers have a semi cylindrical shape which is selected to fit a standard drive shaft (not shown).

Formed into the semi cylindrical inner surface of each cover is a plurality of longitudinally located retaining grooves 140. These grooves 140, in turn, have a mating configuration of upstanding ribs 142, which ribs are located on the mating outer surface of a semi cylindrical bearing 125. The cover 135 is bolted in place over the bearing housing opening in the mounting frame. A pair of split bearings together with the respective covers comprises a water lubricated bearing, which bearing is seated in place over a drive shaft for the vessel.

The inner surface of the split bearing pair in standard fashion may be selected from any known bearing substance, such as rubber or a polymer alloy. Specifications such as a brochure entitled *Thordon Composite Marine Bearings*, Registration #93649, describe a typical selection of prior art bearing shells and surface material which are adapted to water lubricate a vessel's drive shaft. The outer surface is composed of any durable plastic or polymer of sufficient strength to sustain the ribs which mate with the retainer grooves. This outer shell is fused or bonded to the bearing material.

Rather than having smooth exterior shell surfaces of the prior art—such as shown in the *Thordon* specification booklet—the bearing shells of this invention are fitted with protuberances in the nature of lengthwise grooves and lands that form longitudinal ribs 142 of FIG. 1. Such ribs 142 mate with—and fit into—corresponding grooves and lands 140 on the interior of retainer cover 135. This mating rib and groove configuration secures the bearings in a non rotating manner to the covers.

When both covers 135 are fastened in place and bolted to the mounting plate 115, the two halves of the split bearing press against each other. These split bearings will always remain locked together in proper position because of the stiff rib and groove outer shell material. This locked-in-position feature will remain true even when the soft inner bearing material wears away.

My rib and groove bearing cover also provides for ease of replacement with new split bearings as required. On large vessels with a heavy bearing cover, a hook eye 136 may be secured into a threaded opening in cover 135 as an optional fixture for receiving a pull chain for raising, lowering or for safety reasons. Hook eye 136 thus serves as an aide for ease of cover removal during bearing replacement.

Figure 2:
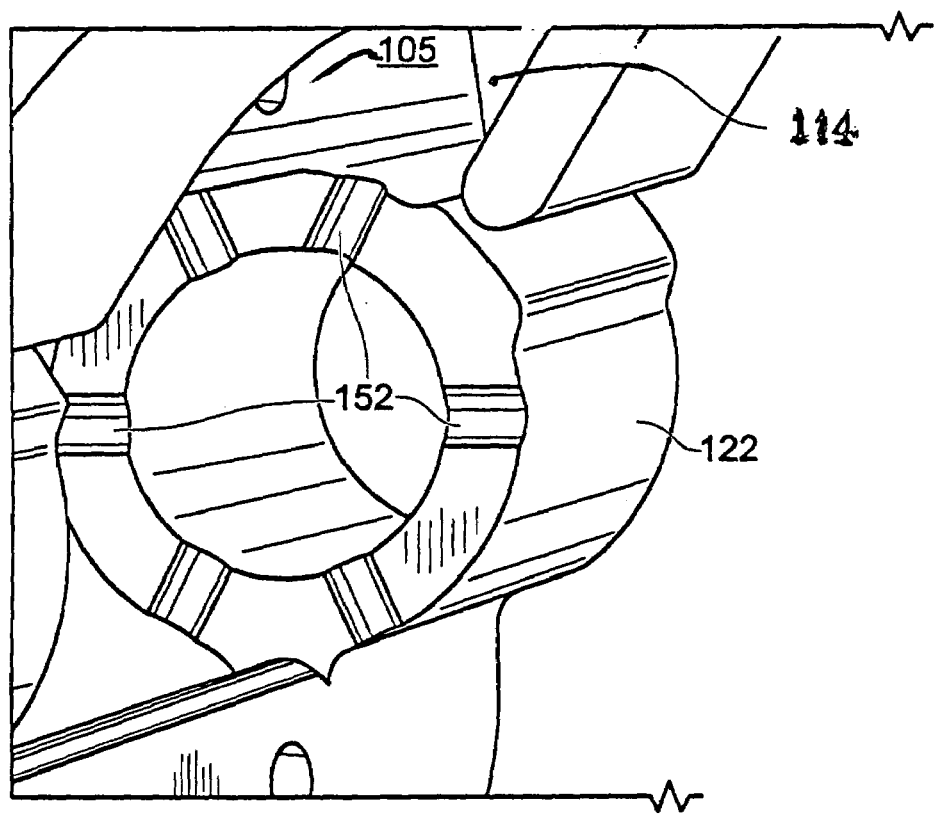
FIG. 2 is a perspective view of an enlarged section of the embodiment of FIG. 1 showing a bearing opening in the mounting frame together with water relief openings which are important should the aft drive shaft portion become fouled.

FIG. 2 is an enlarged portion of FIG. 1 which clearly shows the arch-like opening 114 in strut 110 for a strut mount embodiment. Such an arched opening in strut 110 provides a space for simultaneous right angle cover removal, even underwater. FIG. 2 also shows a series of radial grooves 152 that are formed on the inner periphery of collar 122. Grooves 152 become important should rope, seaweed or the like foul the space aft of collar 122, between the collar and the propeller (not shown). Such grooves are water vents which allow the bearing to be continually water lubricated since these grooves permit the water to pass through the bearing and exit in spite of such fouling aft of the collar 122.

Figure 3:
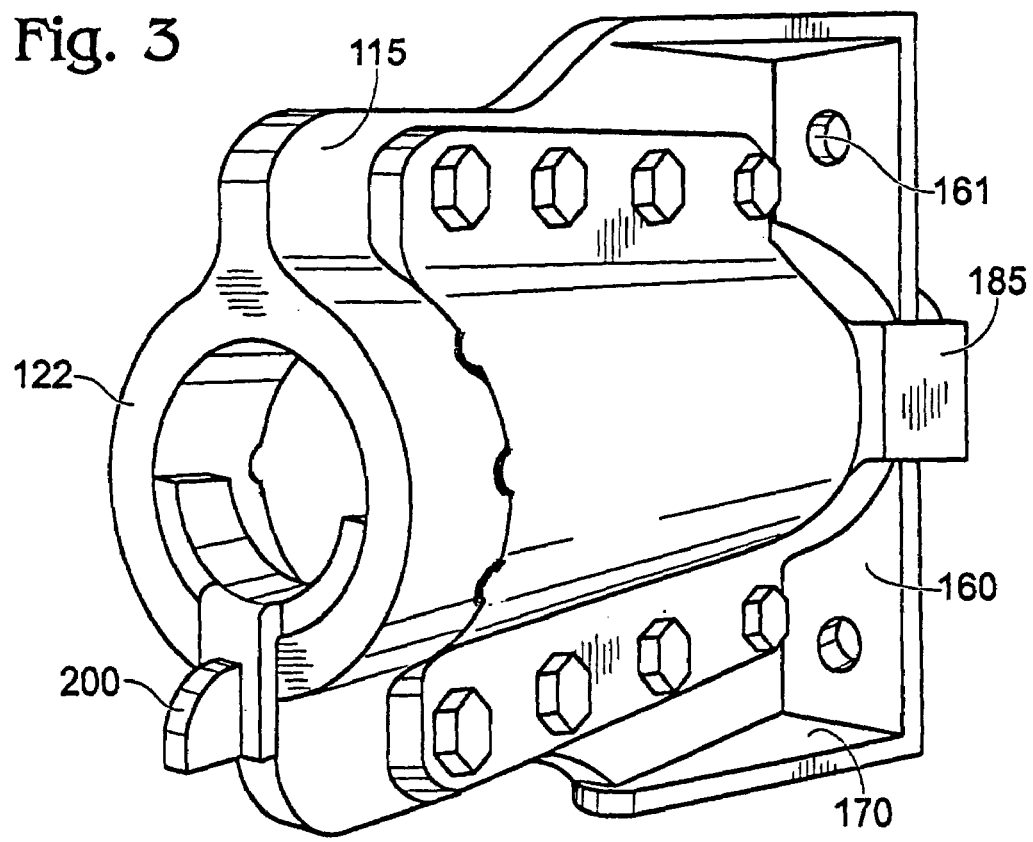
FIG. 3 is a side plan view of a sternpost mounted bearing assemblage in accordance with this invention.

FIG. 3 is a side plan view of a sternpost mount embodiment of my invention. Much of what has been said for FIGS. 1 and 2 need not be repeated here as it is fully applicable to FIG. 3. Please note in a sternpost mount configuration of FIGS. 3 through 6 that the struts of FIG. 1 are replaced by a flat faced sternpost flange 160 which is bolted to the sternpost of a vessel. Flange 160 includes triangular shaped strength webs 170 as best shown perhaps in FIG. 5. These webs 170 add rigidity and strength to the body of the mounting plate 115, which plate 115, as in the case of FIG.

1, is essentially rectangular in shape with a rectangular opening for holding a split bearing and associated right angle removable covers 135.

Figure 4A:
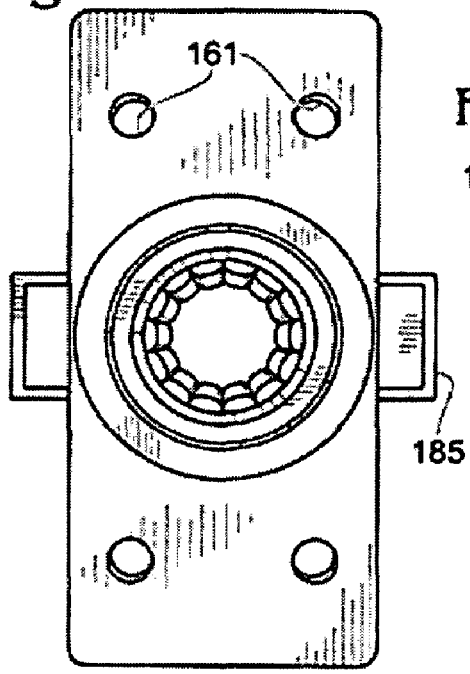
FIG. 4, is a rear view of the sternpost mount embodiment of FIG. 3.
Figure 4B:
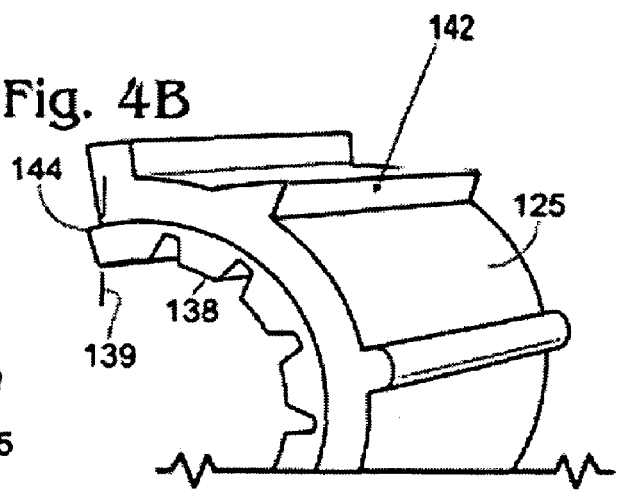
Figure 5:
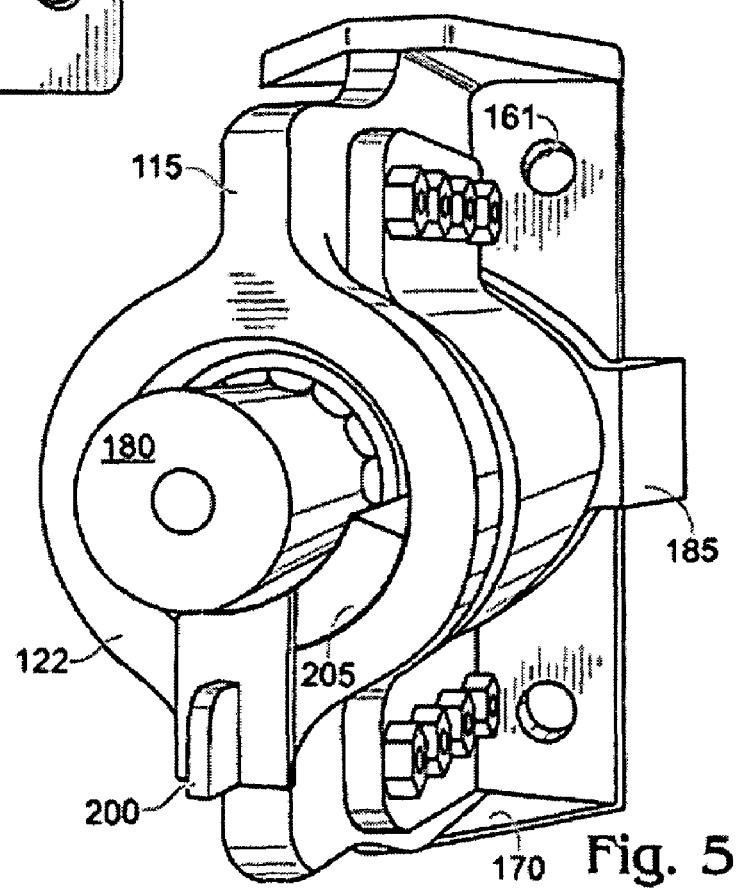
FIG. 5 is a view showing a drive shaft supported by a chock located in an aft collar in accordance with this invention

FIG. 6 depicts the sternpost mount plate 115 of FIG. 5 with the starboard side cover removed in order to fully disclose the port side bearing supporting a drive shaft 180 in place for fully assembled water lubrication. Centrally located on each side of the flange plate 115 is a water inlet opening that allows water to funnel into the inner bearing housing. The forward view of FIG. 4 clearly shows a pair of funnel shaped water inlets 185. FIG. 4 also clearly shows four bolt holes 161 for fastening the flange plate to a sternpost (not shown) of a vessel.

In FIG. 5, the drive shaft 180 is held in a central position by a chock 200 that may be inserted as necessary between the lower surface of the shaft 180 and the inner periphery of collar 122. FIG. 6 depicts chock 200 in place in its support function. Chock 200 includes a semicircular arc 205 having a thickness that is selected to normally position the mid point of shaft 180 in the center of the bearing. As bearing wear takes place—primarily due to silt, sand and the like—the lower portion of a bearing wears away and the shaft 180 tends to drop lower into the frame collars of the assemblage.

For replacement, my method requires that the weight of the drive shaft 180 be temporarily removed from the lower section of the bearing. Such weight relief may be done by lifting the drive shaft by pull chains, jacks or the like. An arcuate-shaped shim, or chock 200, is manually slipped into one of the frame collars where it is placed under the drive shaft. (Please see FIG. 5.)

This chock 200 holds the shaft 180 a small distance away from the lower bearing section as necessary for removing the shaft weight from the lower bearing. Indeed, the thickness of the chock rim 205—FIG. 6—is dimensioned so as to center the drive shaft 180 in the frame collars. For underwater bearing replacement, a diver would simply place a lift chain around the propeller or aft drive shaft and remove some of the weight until the chock 200 may be slipped into position and the lifting chain removed. Chock 200 is thus an important aid in assuring an easy, non-binding bearing removal and replacement operation.

A pair of index pins 215, FIG. 6, protrudes from the flat surface on the top mounting plate 115. These index pins 215 align with appropriately drilled registration openings 220 (see FIGS. 7 and 8) in the top of bearing cover 135. Both pins 215 and registration openings 220 together serve to accurately position and locate the covers and the bearings they contain for easy removal and replacement during repair operations. In case of a bearing replacement for a strut mount of FIG. 1, for example, such index pins 215 hold the cover in position while the artisan doing the repair work is free to insert bolts through the openings 124, FIG. 1.

Each bearing cover 135 as shown in FIG. 8 for example has an indentation 190 therein that allows a screwdriver or pry device to quickly and easily remove a worn split bearing that may be stuck in place without requiring an inward crushing of the bearing shell as characterized by the prior art. FIG. 7 depicts a pry device 205 that has lifted the split bearing 125 up and away from its normal seating in the ribs and grooves of cover 135. Both FIGS. 7 and 8 also show indentations 191 that allow a pry device to release the covers from the frame 115.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A water lubricated marine bearing assemblage, comprising:
   a flat mounting plate with a bearing-receiving opening in the center thereof;
   a pair of separated collars located at opposite ends of the mounting plate, which collars are longitudinally aligned with each other and are welded or otherwise integrally formed into said mounting plate;
   a pair of split semi cylindrical bearings having a soft water lubricating inner surface and a hard outer surface, which outer surface has a series of longitudinal ribs located thereon;
   a pair of opposed split bearing retainer covers with each cover having a semi cylindrical shape which is adapted to receive and house a split bearing for a particular size drive shaft; and
   a plurality of longitudinally located retaining grooves formed into the semi cylindrical inner surface of each cover for receiving therein said series of longitudinal ribs on the outer surface of said semi cylindrical bearings.

2. A water lubricated bearing assemblage in accordance with claim 1 and further comprising:
   means fastening said covers in place over the bearing-receiving opening in the mounting plate, which covers together hold said semi cylindrical bearings in place over said drive shaft.

3. A water lubricated bearing assemblage in accordance with claim 1 wherein said split bearing pair further comprises:
   an inner lubricating bearing material surrounding said drive shaft for water lubricating same during marine operation.

4. A water lubricated bearing in accordance with claim 1 wherein said assemblage further comprises:
   upstanding index pins located on the mounting plate;
   matching registration holes in the bearing covers for receiving said index pins when said covers are in place, which pins and registration holes position and locate said retainer covers for bearing repair and replacement during repair operations.

5. A water lubricated bearing assemblage in accordance with claim 3 wherein said inner lubricating material of said split bearing pair further comprises:
   in cross section, an extension of the bearing lubricating material on the inner periphery beyond a perpendicular plane starting at the edge of the outer periphery of the bearing lubricating material and running along the length of a parting line for a pair of bearing halves, which extension provides an additional compression of lubricating material when the retaining covers are tightened in place on said mounting plate.

6. A water lubricated bearing assemblage in accordance with claim 1 wherein said assemblage further comprises:
   each bearing cover further including an indentation therein that allows a pry device to remove a worn split bearing from said cover.

7. A water lubricated bearing assemblage in accordance with claim 1 wherein said assemblage includes an inboard collar and aft collar with each collar having inboard ends and said assemblage further comprises:

water passages formed in the inboard end(s) of the inboard/aft collars, which passages serve as a water outlet for the water lubricant should the drive shaft become fouled.

8. A water lubricated bearing assemblage in accordance with claim 1 wherein said collars on the upper radial portions thereof have welding flanges, and said assemblage further comprises:
   a pair of struts welded to said flanges for mounting said bearing assemblage to the hull of a vessel.

9. A water lubricated bearing assemblage in accordance with claim 8 and including keel struts, which assemblage further comprises:
   an arc-shaped opening in said keel struts which allows for the removal of said retainer covers for repair in dry dock or in the water.

10. A water lubricated bearing assemblage in accordance with claim 1 wherein said mounting plate has oriented transversely thereto a flat mounting flange, and said assemblage further comprises:
    means for fastening said mounting flange to the sternpost of a vessel.

11. A method of fabricating a water lubricated marine bearing assemblage for a vessel, said method comprising the steps of:
    fashioning an essentially rectangular flat mounting plate with an elongated bearing-receiving opening in the center thereof;
    integrally forming in said mounting plate a pair of separated collars located at opposite ends of said mounting plate, which collars are longitudinally aligned with each other;
    adapting a pair of split semi cylindrical bearings with a soft water lubricating inner surface and a hard outer surface;
    forming a series of longitudinal ribs in said outer surface;
    retaining said bearings in a pair of opposed split bearing covers, with each cover having a semi cylindrical shape which is adapted to receive and house a split bearing for a particular size drive shaft;
    forming into said semi cylindrical inner surface of each cover a plurality of longitudinally located retaining grooves mating with and holding said ribs on the outer surface of said semi cylindrical bearing.

12. A method of removing and replacing a water lubricated marine bearing in an assemblage fabricated in accordance with claim 11, said method comprising the additional steps of:
    temporarily relieving the weight of the drive shaft from the bearing;
    inserting between the drive shaft and one of the collars an arcuate-shaped shim;
    holding the shaft away from the lower section of the bearing by said inserted shim;
    removing a cover holding therein a split bearing;
    inserting a replacement bearing into said cover; and
    replacing said cover into said assemblage.

13. A method of replacing a water lubricated marine bearing in an assemblage fabricated in accordance with claim 12, said method comprising the additional steps of:
    selecting the thickness of the shim itself so as to center the longitudinal axis of said drive shaft in the center of said collars.

14. A water lubricated marine bearing assemblage for ease of bearing repair with a vessel in dry dock or in the water, said assemblage comprising:
    a mounting plate with a pair of separated collars located at opposite ends of the mounting plate and a bearing opening between the collars;
    a pair of split water lubricating bearings having a series of longitudinal ribs outwardly located thereon;
    said collars having shoulder means for preventing fore and aft movement of said bearing; and
    a pair of opposed split bearing retainer covers having a plurality of longitudinal grooves formed on the inner surface of each cover for receiving therein matching outer ribs on said split bearings.

15. A water lubricated bearing in accordance with claim 14 wherein said assemblage further comprises:
    upstanding index pins located on the mounting plate;
    matching registration holes in the bearing covers for receiving said index pins when said covers are in place.

16. A water lubricated bearing assemblage in accordance with claim 14 wherein said split bearings have a parting line between bearing halves, and said bearings further comprise:
    an upstanding rib of bearing material running along the length of said parting line for said pair of bearing halves.

17. A water lubricated bearing assemblage in accordance with claim 14 wherein said assemblage further comprises:
    each bearing cover further including means for receiving a pry device for removing a worn bearing from said cover.

18. A water lubricated bearing assemblage in accordance with claim 14 wherein said assemblage further comprises:
    water passages formed between the cover and the inboard ends of the shaft collars as water outlets.

19. A water lubricated bearing assemblage in accordance with claim 14 wherein said collars are in fore and aft positions in said assemblage and said assemblage further comprises:
    said collar(s) having means for protecting the soft bearing material from scouring due to debris caught around the vessel's propeller and shaft.

20. A water lubricated bearing assemblage in accordance with claim 14 wherein said assemblage further comprises:
    an indentation in the bearing covers to aid in removal of said covers from the mounting plate.

* * * * *